H. P. ALLEN.
REEL.
APPLICATION FILED SEPT. 19, 1913.
1,229,697.
Patented June 12, 1917.
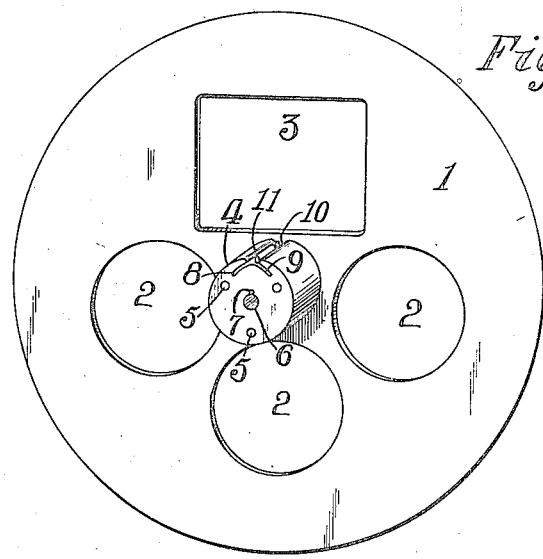
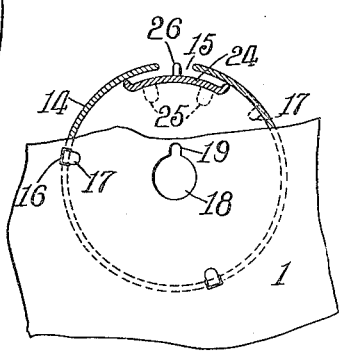
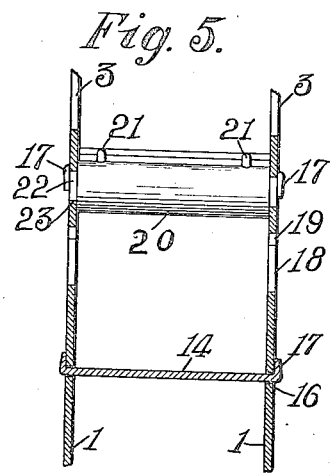
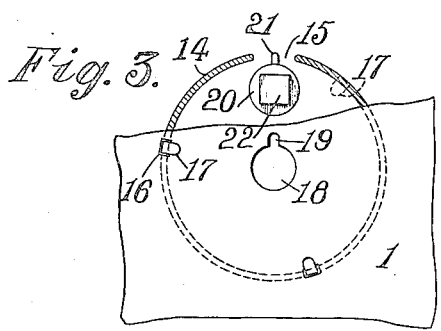
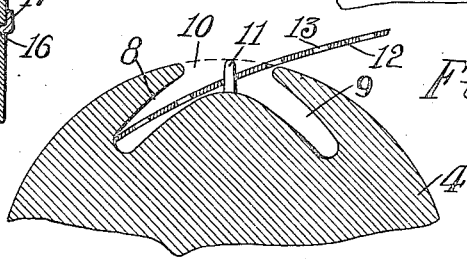
Witnesses:
J. A. Brophy
William A. Hardy
Inventor:
Harry P. Allen
by Dyer & Holden
his Attys.

UNITED STATES PATENT OFFICE.

HARRY PORTER ALLEN, OF AUSTIN, TEXAS, ASSIGNOR TO NEW JERSEY PATENT COMPANY, OF WEST ORANGE, NEW JERSEY, A CORPORATION OF NEW JERSEY.

REEL.

1,229,697.     Specification of Letters Patent.     Patented June 12, 1917.

Application filed September 19, 1913. Serial No. 790,651.

*To all whom it may concern:*

Be it known that I, HARRY P. ALLEN, a citizen of the United States, and a resident of Austin, in the county of Travis and State of Texas, have invented a certain new and useful Improvement in Reels, of which the following is a description.

My invention relates to reels and more particularly to improved construction for attaching the end of a moving picture film, or other film or strip, to the hubs or drums of such reels.

In the film reels ordinarily used for moving picture machines, the hub or drum of the reel is provided either with a spring catch under which the end of the film is engaged, or, where the hub or drum of the reel is hollow, it is sometimes provided with a narrow longitudinal slot through which the end of the film is inserted. When a spring catch is employed, it is customary, in attaching the film to the hub, to fold the end portion of the film one or more times on itself and to then insert the folded end under the catch. In reels in which the hub is provided with a narrow slot, the film is attached to the hub by inserting the end thereof in such slot, whereby on winding the film on the reel a sharp bend is formed in the end of the film by the edges of the slot, which bend offers sufficient frictional resistance to prevent the film being pulled from the hub. Both these constructions are objectionable because of the fact that the folds or bends, formed in attaching the film to the hub or drum of the reel, cause the film to crack, and in time the end of the film will be broken off; and since the film is used repeatedly, sooner or later, parts of the film carrying matter to be exhibited will be broken off. The construction in which a spring catch is employed, for attaching the film to the hub of the reel, is further objectionable because, when the end of the film is reached in unwinding the film, such end does not readily disengage from the hub.

The principal object of my invention is to provide a cheap, simple and improved reel, whereby the above objections will be obviated and whereby a film or strip may be readily attached to the hub or drum of the reel. My invention also consists in the provision of an improved hub or drum for reels.

Other objects and features of my invention will appear more fully in the following description and appended claims.

In the drawing accompanying and forming a part of the specification—

Figure 1 is a view in perspective of a film reel in accordance with my invention, one of the side plates or disks being omitted;

Fig. 2 is a transverse sectional view of a portion of the hub of the reel of Fig. 1, showing the manner in which the end of a film is attached thereto;

Figs. 3 and 4 are fragmental views, partly in section, of film reels having modified forms of hubs; and Fig. 5 is a sectional view, partly in elevation, of a portion of the reel shown in Fig. 3.

Referring to Figs. 1 and 2, reference character 1 represents the side plates or disks of a film reel, which are preferably stamped from sheet metal. Each of the disks is preferably provided with openings 2 which lighten the disks and provide means whereby the material wound on the reel may be inspected. Each disk or plate 1 is also provided with a large hand opening 3, the purpose of which will hereinafter be set forth. The side plates or disks 1 are respectively secured to the ends of a hub or drum 4 in any suitable manner, as by screws, (not shown), which pass through the disks and are threaded into openings 5 in the ends of the hub.

The hub or drum 4 shown in Figs. 1 and 2 is solid, being preferably formed of wood, and is provided with an opening 6 therethrough having a spline groove 7, whereby the reel may be readily keyed to the usual reel actuating shaft or spindle. The hub or drum 4 is also provided with a pair of oppositely disposed reëntrant slots 8 and 9, these slots being substantially parallel to the axis of the drum and having a common opening 10 in the surface of the drum through which the end of the film 12 may be inserted into either of the slots. Reference character 11 represents a pair of pins 11 which are secured to the hub or drum 4 and which are spaced apart a distance equal to the distance between the two rows of perforations in the film or strip to be wound. The pins 11 extend substantially radially of the hub or drum 4 and are located substantially centrally of the opening 10 of slots 8 and 9. The ends of the pins 11 are slightly rounded and are preferably substantially coincident with the outer surface of the drum, as indicated in dotted lines in Fig. 2. Slots 8 and 9 are each preferably much greater in width than the thickness of the film. The distance between either edge of the opening 10 and the pins 11 is also preferably much greater than the thickness of the film. The side disks or plates 1 are so secured to the hub or drum 4 that the hand openings 3 will be adjacent that portion of the hub or drum provided with slots 8 and 9, to thereby facilitate the insertion of the end of the film 12 into one of the slots 8 and 9 and the engagement of one pair of the perforations 13 of the film with pins 11, in attaching the end of the film to the hub or drum.

It will be obvious that the construction of the hub or drum 4, above described, affords means whereby the end of the film may be easily and quickly attached to the drum, for winding, without forming any folds or sharp bends in the end portion of the film; and that in unwinding the film, when the end thereof is reached, said end will readily slip off pins 11 and thereby disengage itself from the drum without appreciably bending the film.

In Figs. 3 and 5, I have shown a reel having the side disks or plates 1 secured to a hollow metal hub or drum 14 having a longitudinal slot or opening 15. The hub or drum 14 is preferably formed by bending a strip of metal into cylindrical shape, with the ends of the strip spaced a distance apart substantially equal to the width of the opening 10 of the hub 4 of the reel shown in Figs. 1 and 2, to thereby form slot 15. The drum 14 is preferably formed with tongues or projections 17 which pass through openings 16 in the side plates 1 and are bent over, to thereby secure the drum 14 and disks or plates 1 firmly together. The disks or plates 1 are each provided with a central opening 18 having a keyway 19 whereby the reel may be readily keyed to the reel-actuating shaft. Reference character 20 represents a support, preferably cylindrical in shape, for a pair of pins 21, similar to pins 11 of the reel shown in Figs. 1 and 2. Support 20 is provided with squared ends 22 which take into squared openings 23 in side plates or disks 1, whereby the support 20 is secured between said disks or plates. Openings 23 are so located and ends 22 of support 20 are so positioned therein that support 20 will be within hub 14 and the pins 21 will extend radially of the drum 14, and will be located substantially centrally of slot 15, with their outer ends substantially coincident with the outer surface of the drum. The film is attached to and released from drum 14 in the same manner as described above with respect to the reel shown in Figs. 1 and 2.

The reel shown in Fig. 4 is very similar to that of Figs. 3 and 5, but in place of the cylindrical support 20 I provide a support 24, preferably formed of sheet metal having tongues or projections 25 by means of which it is secured to the side disks or plates 1 within hub or drum 14. Support 24 is also provided with pins 26, which correspond to pins 11 and 21 of the reels disclosed in Figs. 1 and 3 respectively, and which may be struck up or otherwise formed on member 24. The support 24 is so secured to disks or plates 1 that pins 26 will occupy the same position relative to the hub 14 and opening 15 as pins 21 of the device of Figs. 3 and 5.

While I have shown and described several specific embodiments of my invention, it is to be understood, of course, that my invention may be embodied in numerous other forms without any departure from the spirit of my invention and the scope of the appended claims.

Having now described my invention, what I claim as new and desire to protect by Letters Patent is as follows:

1. A film reel comprising a hub or drum, said drum being provided with a longitudinal slot for the reception of the end portion of a film, and a pair of outwardly extending members disposed in said slot and adapted to engage said end portion of the film, said members being so positioned as to automatically disengage themselves from the film when the latter is completely unwound from said drum, substantially as described.

2. A hub or drum for film reels, said drum being provided with a longitudinal slot for the reception of the end portion of a film, and outwardly extending means disposed in said slot adapted to engage said end portion of the film, said means being so positioned as to automatically disengage the film when the latter is completely unwound from said drum, substantially as described.

3. A film reel comprising a hub or drum having a longitudinal slot for the reception of the end of a film, said slot being substantially greater in width than the thickness of the film, and a pair of outwardly extending spaced pins secured to the hub or drum and located substantially centrally of said slot, substantially as described.

4. A film reel comprising a hub or drum having a longitudinal slot for the reception of the end of a film, said slot being substantially greater in width than the thickness of the film, and a pair of spaced pins extending substantially radially of the hub or drum and located substantially centrally of said slot, the outer ends of the pins being substantially coincident with the outer surface of the hub or drum, substantially as described.

5. A film reel comprising a hub or drum having a longitudinal slot for the reception of the end of a film, and a pair of outwardly and substantially radially extending spaced pins fixedly mounted in said slot adjacent the ends thereof for engaging the usual perforations in the edge portions of the film, the distance between said pins and one side of the slot being sufficient to permit the film to disengage said pins without appreciably bending the film, substantially as described.

6. A film reel comprising a hub or drum, side disks or plates secured thereto, said drum being provided with a longitudinal slot adapted to receive the end of a film, and a pair of spaced pins secured to the drum which extend outwardly with respect to the axis of the drum intermediate the sides of said slot, substantially as described.

7. A hub or drum for film reels provided with a pair of oppositely disposed reëntrant slots substantially parallel to the axis thereof, said slots having a common opening in the surface of the hub, and means located in said opening and adapted to engage the end portion of a film wound on the hub, said means being so positioned as to automatically disengage the film when the latter is completely unwound from the hub, substantially as described.

8. A hub or drum for film reels provided with a pair of oppositely disposed reëntrant slots substantially parallel to the axis thereof, said slots having a common opening in the surface of the hub or drum, and a pair of spaced pins extending substantially radially of the drum and located substantially centrally of said openings, substantially as described.

9. A hub or drum for film reels provided with a reëntrant slot parallel to the axis thereof, and a pair of spaced pins secured thereto, said pins extending substantially radially of the drum and being located substantially centrally of the opening of the slot in the surface of the drum, substantially as described.

This specification signed and witnessed this 2nd day of Sept., 1913.

HARRY PORTER ALLEN.

Witnesses:
R. F. CAMPBELL,
A. S. ANDERSON.